United States Patent
Kotzur et al.

(10) Patent No.: US 11,231,881 B2
(45) Date of Patent: Jan. 25, 2022

(54) RAID DATA STORAGE DEVICE MULTI-STEP COMMAND COORDINATION SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 16/838,919

(22) Filed: Apr. 2, 2020

(65) Prior Publication Data
US 2021/0311662 A1 Oct. 7, 2021

(51) Int. Cl.
*G06F 3/06* (2006.01)
(52) U.S. Cl.
CPC .......... *G06F 3/0659* (2013.01); *G06F 3/0604* (2013.01); *G06F 3/0619* (2013.01); *G06F 3/0689* (2013.01)
(58) Field of Classification Search
CPC .... G06F 3/0659; G06F 3/0604; G06F 3/0689; G06F 3/0619
See application file for complete search history.

(56) References Cited

U.S. PATENT DOCUMENTS

| | | | |
|---|---|---|---|
| 9,910,786 B2 | 3/2018 | Freyensee et al. | |
| 2003/0163509 A1* | 8/2003 | McKean | G06F 9/5027 718/100 |
| 2006/0179255 A1* | 8/2006 | Yamazaki | G06F 15/167 711/147 |
| 2008/0034190 A1 | 2/2008 | Rodgers et al. | |
| 2013/0117750 A1* | 5/2013 | Howes | G06F 9/522 718/102 |

OTHER PUBLICATIONS

White Barrier. (n.d.) In Wikipedia. Retrieved Mar. 31, 2020, from https://en.wikipedia.org/wiki/Write_barrier.

* cited by examiner

*Primary Examiner* — Kalpit Parikh
(74) *Attorney, Agent, or Firm* — Joseph Mencher

(57) ABSTRACT

A RAID data storage device multi-step command coordination system includes a RAID storage controller device that generates and transmits a first multi-step command that includes a barrier instruction, and a second multi-step command that includes a notification instruction. A first RAID data storage device receives the first multi-step command, identifies the barrier instruction in the first multi-step command and, in response, pauses performance of first multi-step command. A second RAID data storage device receives the second multi-step command, identifies the notification instruction in the second multi-step command and, in response, transmits a notification to the first RAID data storage device. While pausing the performance of the first multi-step command, the first RAID data storage device determines that the notification has been received and, in response, resumes the performance of the first multi-step command.

20 Claims, 14 Drawing Sheets

RAID DATA STORAGE DEVICE MULTI-STEP COMMAND COORDINATION SYSTEM

BACKGROUND

The present disclosure relates generally to information handling systems, and more particularly to coordinating multi-step commands between RAID data storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that depend on a desired level of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) storage devices) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and is even projected to be much greater than the performance capabilities of next-generation RAID storage controllers), which results in those RAID storage controllers unable to manage more than a few NVMe storage devices (e.g., conventional RAID storage controllers are capable of managing approximately four NVMe storage devices). As such, the use of NVMe storage devices in RAID storage subsystems present RAID storage system scaling issues, as the RAID storage controllers cannot scale with more than a few NVMe storage devices.

The inventors of the present disclosure describe techniques for providing RAID storage multi-step commands to RAID data storage devices in U.S. patent application Ser. No. 16/832,348, filed on Mar. 27, 2020, the disclosure of which is incorporated herein by reference. As described in that application, the RAID storage multi-step commands provide flexible technique for allowing a RAID storage controller device to send a single, multi-step command to a RAID storage device that expresses multiple steps of operations that the RAID storage device should perform, thus relieving the RAID storage controller device of many command overhead operations. However, the inventors of the present disclosure have discovered that issues can arise when the multi-step commands discussed above are provided to multiple RAID data storage devices, particularly when the steps performed by any of those RAID data storage devices rely on the performance of steps performed by any of the other RAID data storage devices.

Accordingly, it would be desirable to provide a RAID storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a RAID data storage engine that is configured to: receive, from a RAID storage controller device, a first multi-step command; identify a barrier instruction included in the first multi-step command; pause, in response to identifying the barrier instruction, performance of first multi-step command; determine, while pausing the performance of the first multi-step command, that a first notification has been received from a RAID data storage device; and resume, in response to determining that the first notification has been received, the performance of the first multi-step command.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
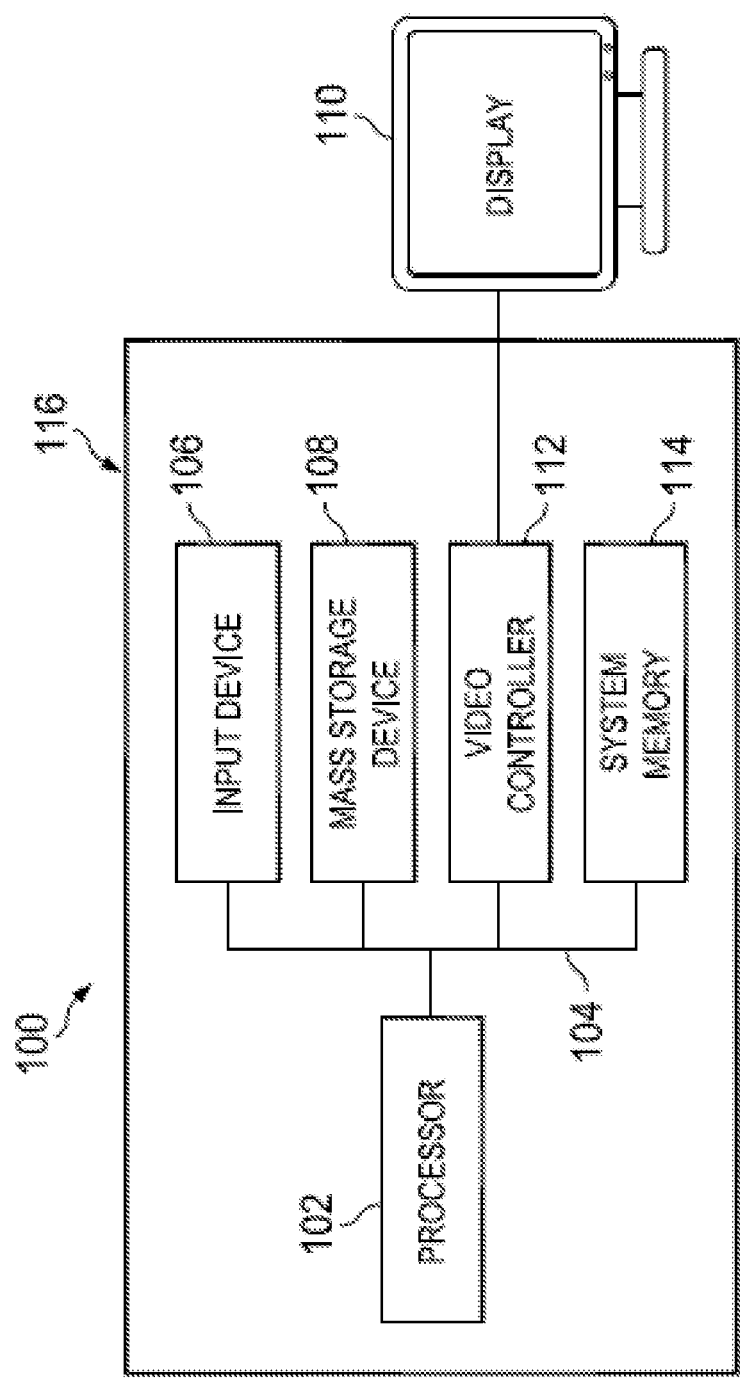
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
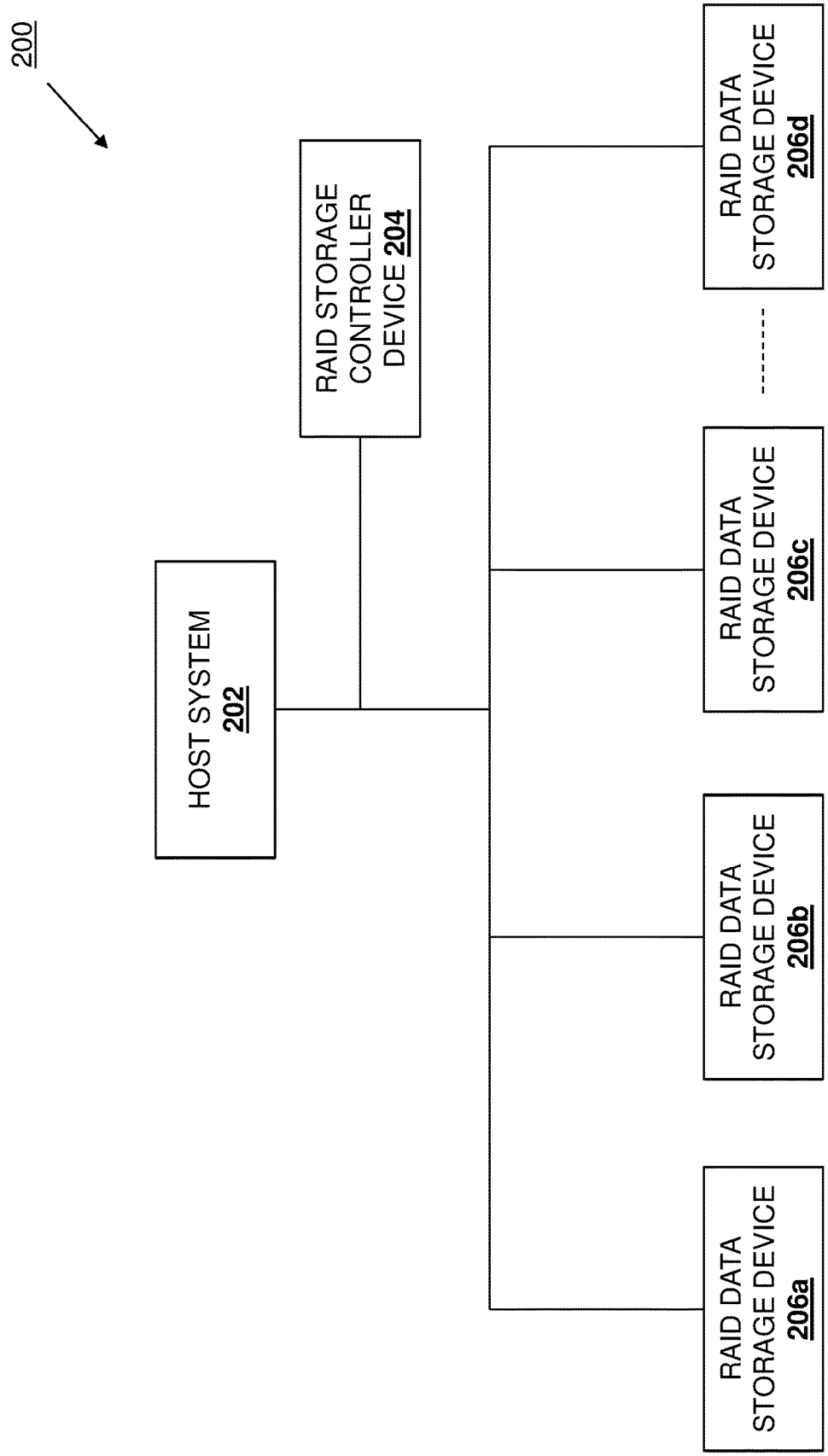
FIG. 2 is a schematic view illustrating an embodiment of a RAID data storage system.

Referring now to FIG. 2, an embodiment of a Redundant Array of Independent Disks (RAID) storage system 200 is illustrated. In the illustrated embodiment, the RAID data storage system 200 includes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a RAID storage controller device 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, in the illustrated embodiment, the RAID data storage system 200 also includes a plurality of RAID data storage devices 206a, 206b, 206c, and up to 206d, each of which is coupled to the host system 202 and the RAID storage controller device 204. While a few RAID data storage devices 206a-206d are illustrated, one of skill in the art in possession of the present disclosure will recognize that many more storage devices may (and typically will) be coupled to the RAID storage controller device 204 (e.g., in a datacenter) while remaining within the scope of the present disclosure. In the embodiments discussed below, the RAID data storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
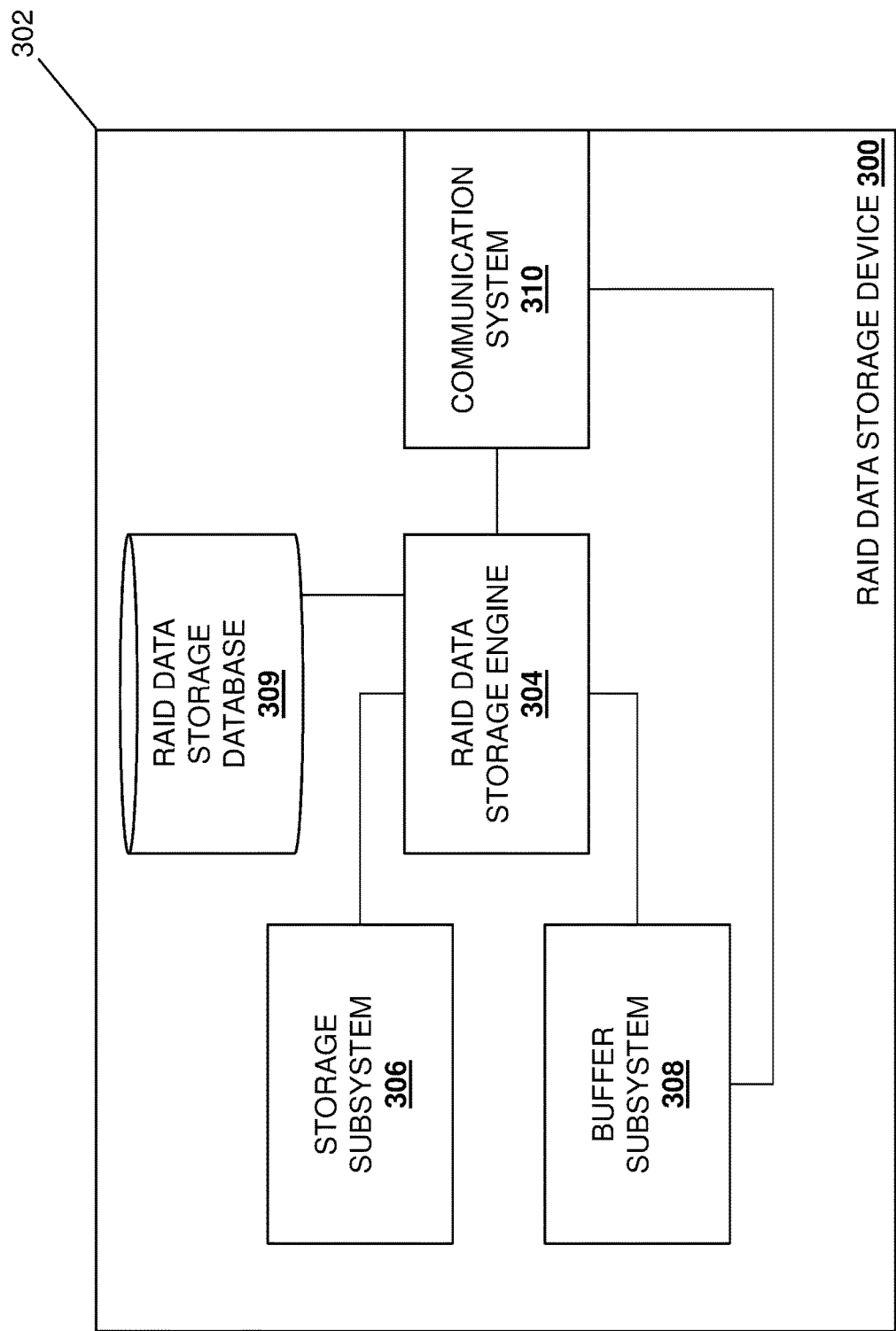
FIG. 3 is a schematic view illustrating an embodiment of a RAID data storage device that may be provided in the RAID data storage system of FIG. 2.

Referring now to FIG. 3, an embodiment of a RAID data storage device 300 is illustrated that may provide any or all of the RAID data storage devices 206a-206d discussed above with reference to FIG. 2. As such, the RAID data storage device 300 may be provided by an NVMe SSD storage devices, but one of skill in the art in possession of the present disclosure will recognize that other types of storage devices with similar functionality as the NVMe SSDs (e.g., NVMe PCIe add-in cards, NVMe M.2 cards, etc.) may be implemented according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID data storage devices discussed below. While not illustrated, one of skill in the art in possession of the present disclosure will recognize that the RAID storage engine 304 may include, or be coupled to, other components such as queues (e.g., submission queues and completion queues) and/or RAID data storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer subsystem 308 that is coupled to the RAID storage engine 304 (e.g., via a coupling between the buffer subsystem 308 and the processing system). Continuing with the example provided above in which the RAID data storage device 300 is an NVMe SSD storage device, the buffer subsystem 308 may be provided by a Controller Memory Buffer (CMB). However, one of skill in the art in possession of the present disclosure will recognize that the buffer subsystem 308 may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system) and the buffer subsystem 308, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include any NVMe SSD storage device communication components that enable Direct Memory Access (DMA) operations, as well as any other NVMe SDD storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
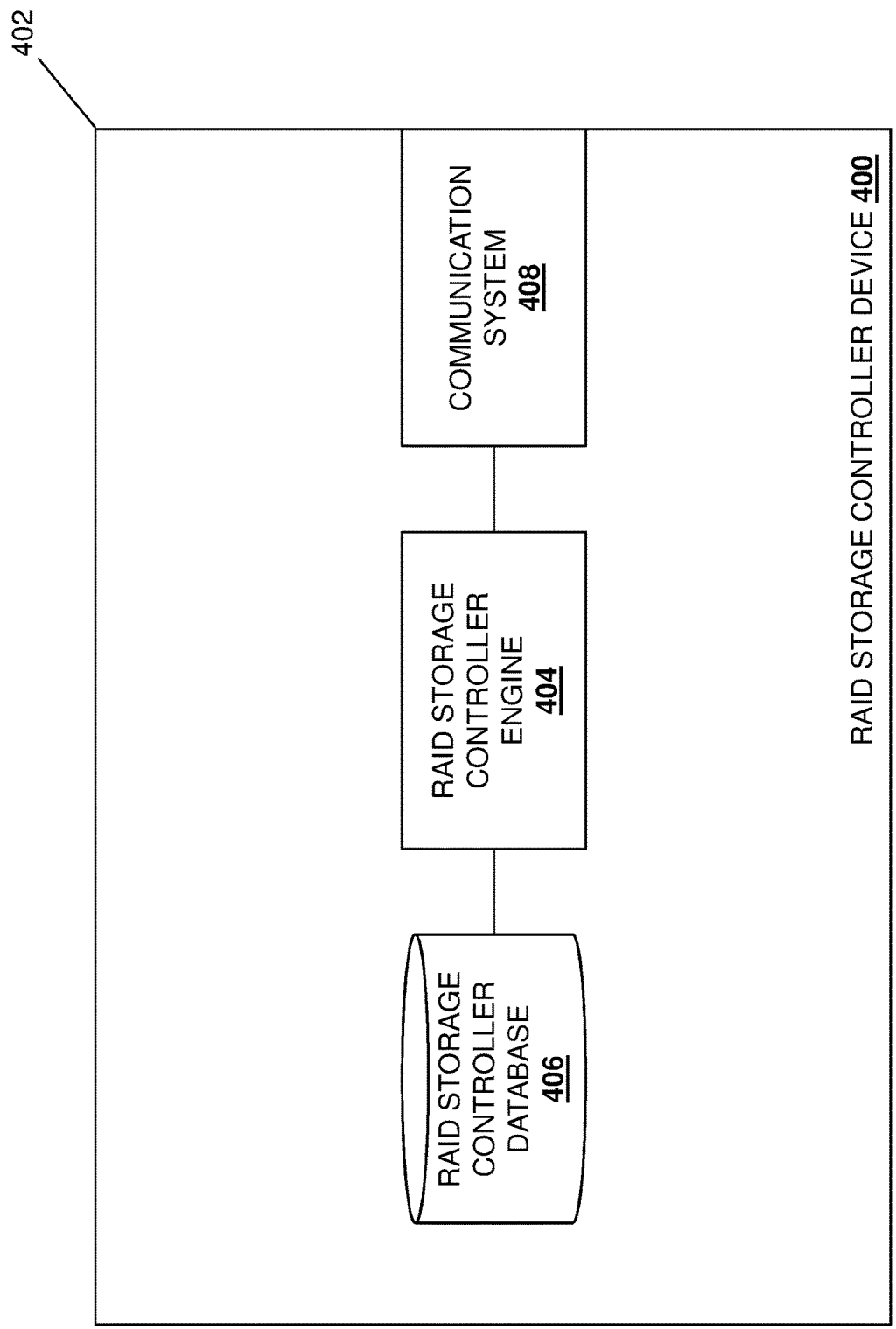
FIG. 4 is a schematic view illustrating an embodiment of a RAID storage controller device that may be provided in the RAID data storage system of FIG. 2.

Referring now to FIG. 4, an embodiment of a RAID storage controller device 400 is illustrated that may provide the RAID storage controller device 204 discussed above with reference to FIG. 2. As such, the RAID storage controller device 400 may be provided by the IHS 100 discussed above with reference to FIG. 1 and/or may include some or all of the components of the IHS 100. Furthermore, while illustrated and discussed as a RAID storage controller device 400, one of skill in the art in possession of the present disclosure will recognize that the functionality of the RAID storage controller device 400 discussed below may be provided by other devices that are configured to operate similarly as discussed below. In the illustrated embodiment, the RAID storage controller device 400 includes a chassis 402 that houses the components of the RAID storage controller device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage controller engine 404 that is configured to perform the functionality of the RAID storage controller engines and/or RAID storage controller devices discussed below.

The chassis 402 may also house a storage system (not illustrated, but which may include the storage 108 discussed above with reference to FIG. 1) that is coupled to the RAID storage controller engine 404 (e.g., via a coupling between the storage system and the processing system) and that includes a RAID storage controller database 406 that is configured to store any of the information utilized by the RAID storage controller engine 404 discussed below. The chassis 402 may also house a communication system 408 that is coupled to the RAID storage controller engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

While a specific RAID storage controller device 400 has been illustrated, one of skill in the art in possession of the present disclosure will recognize that RAID storage controller devices (or other devices operating according to the teachings of the present disclosure in a manner similar to that described below for the RAID storage controller device 800) may include a variety of components and/or component configurations for providing conventional RAID storage controller device functionality, as well as the functionality discussed below, while remaining within the scope of the present disclosure as well. For example, while the RAID storage controller device 400 has been described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 400 discussed below may be performed via the processing system in the host system 202.

Figure 5:
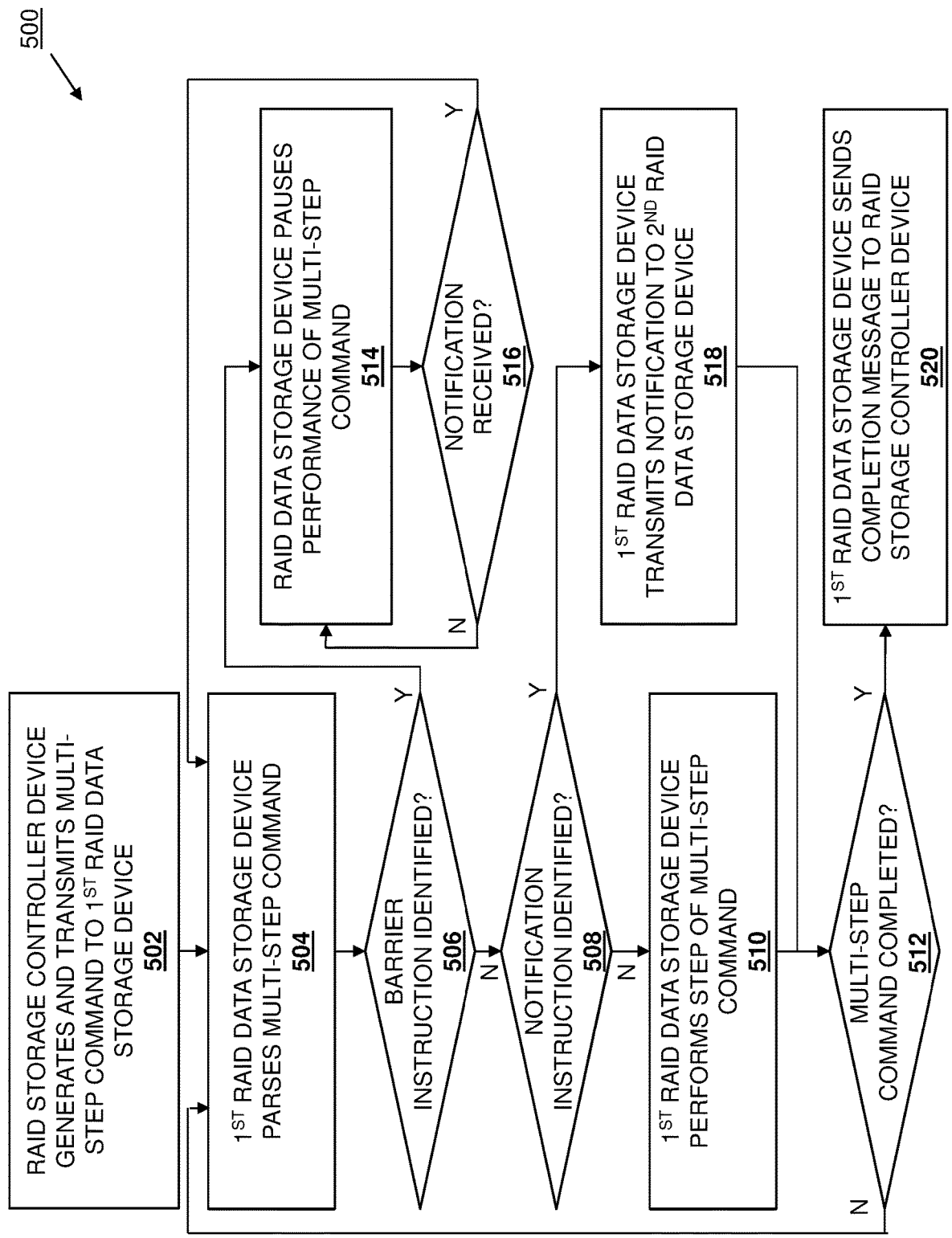
FIG. 5 is a flow chart illustrating an embodiment of a method for coordinating multi-step commands performed by RAID data storage devices.

Referring now to FIG. 5, an embodiment of a method 500 for coordinating multi-step commands performed by RAID data storage devices is illustrated. As discussed below, the systems and methods of the present disclosure provide for the coordination of the performance of the steps in respective multi-step commands by different RAID data storage devices. For example, a RAID storage controller device may generate and transmit a first multi-step command that includes a barrier instruction to a first RAID data storage device, and may generate and transmit a second multi-step command that includes a notification instruction to a second RAID data storage device. The first RAID data storage device receives the first multi-step command, identifies the barrier instruction included in the first multi-step command and, in response, pauses performance of first multi-step command. The second RAID data storage device receives the second multi-step command, identifies the notification instruction included in the second multi-step command and, in response, transmits a notification to the first RAID data storage device. The first RAID data storage device determines, while pausing the performance of the first multi-step command, that the notification has been received and, in response, resumes the performance of the first multi-step command. As such the performance of different multi-step commands by different RAID data storage devices may be coordinated, which one of skill in the art in possession of the present disclosure will recognize provides particular benefits when the steps performed by one of those RAID data storage devices rely on the performance of steps by any of the other RAID data storage devices.

In the examples below, the RAID multi-step commands are discussed as being coordinated between two RAID data storage devices, with each of the RAID data storage devices 206a and 206b performing the RAID data storage device portion of the method 500. However, one of skill in the art in possession of the present disclosure will appreciate that the simplified example provided below may be extended to the coordination of RAID multi-step commands between more than two RAID data storage devices, and thus any number of RAID data storage devices may perform the RAID data storage device portion of the method 500 while remaining within the scope of the present disclosure as well. Furthermore, while the initial example below includes only a single barrier instruction for the first RAID data storage device and a single notification instruction for the second RAID data storage, further examples below extend that functionality to both barrier instructions and notification instructions provided to each of the first and second RAID data storage devices, and one of skill in the art in possession of the present disclosure will appreciate how the multi-step command coordination functionality described herein may be extended to provide any number of barrier instructions and/or notification instructions to any number of RAID data storage devices while remaining within the scope of the present disclosure as well.

The method 500 begins at block 502 where a RAID storage controller generates and transmits a multi-step command to a first RAID data storage device. In different embodiments that provide for the performance of the method 500 for the RAID data storage devices 206a and 206b, respectively, at block 502 the RAID storage controller engine 404 in the RAID storage controller device 204/400 may generate respective multi-step commands for each of the RAID data storage device 206a and the RAID data storage device 206b. For example, the inventors of the present disclosure describe techniques for providing RAID storage multi-step commands to RAID data storage devices in U.S. patent application Ser. No. 16/832,348, filed on Mar. 27, 2020, the disclosure of which is incorporated herein by reference. However, while particular multi-step commands are described in the U.S. Patent Application identified above, one of skill in the art in possession of the present disclosure will appreciate how the teachings of the present disclosure may be applied to other commands with multiple steps while remaining within the scope of the present disclosure as well.

Figure 6A:
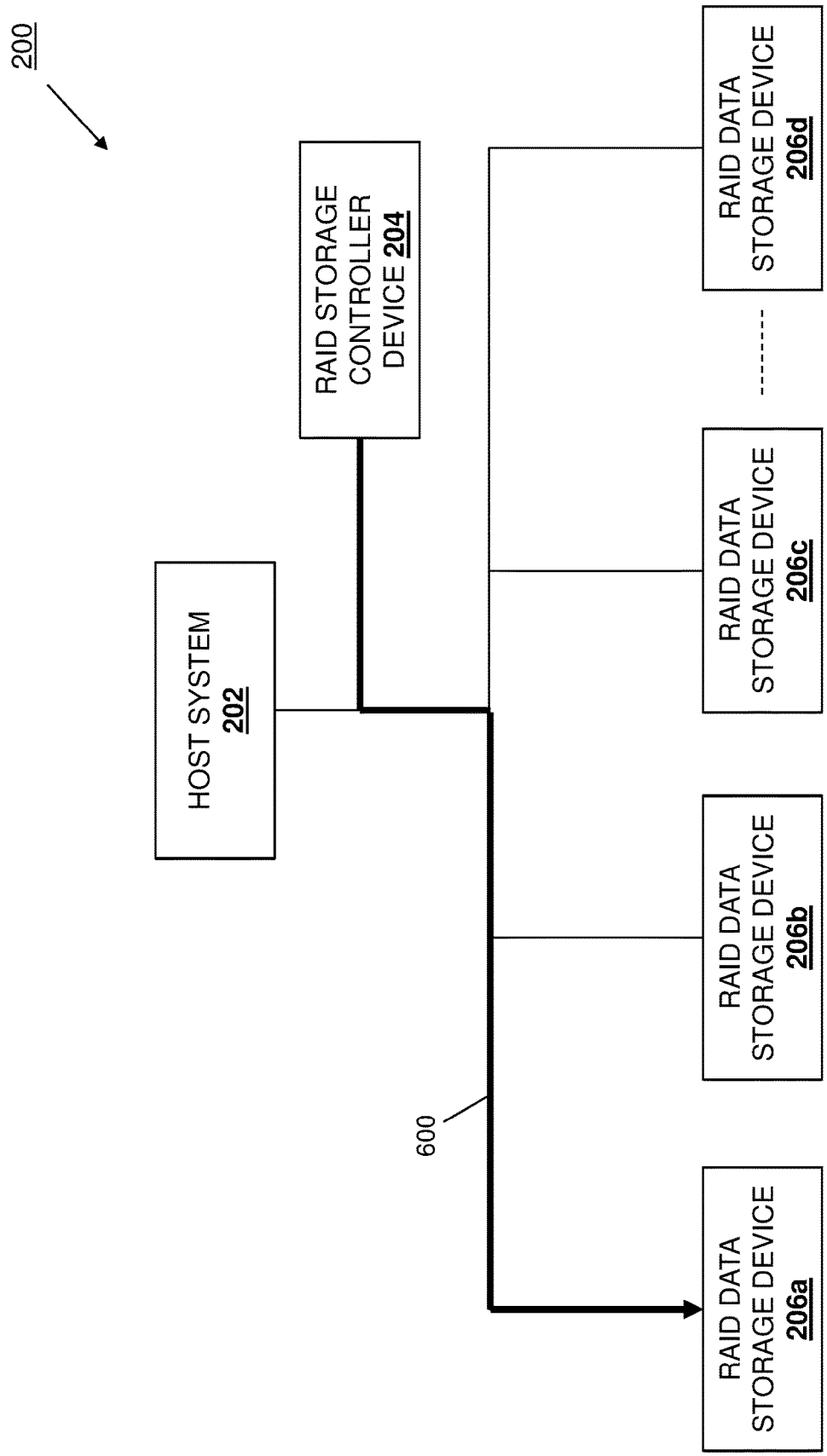
FIG. 6A is a schematic view illustrating an embodiment of the RAID data storage system of FIG. 2 operating during the method of FIG. 5.
Figure 6B:
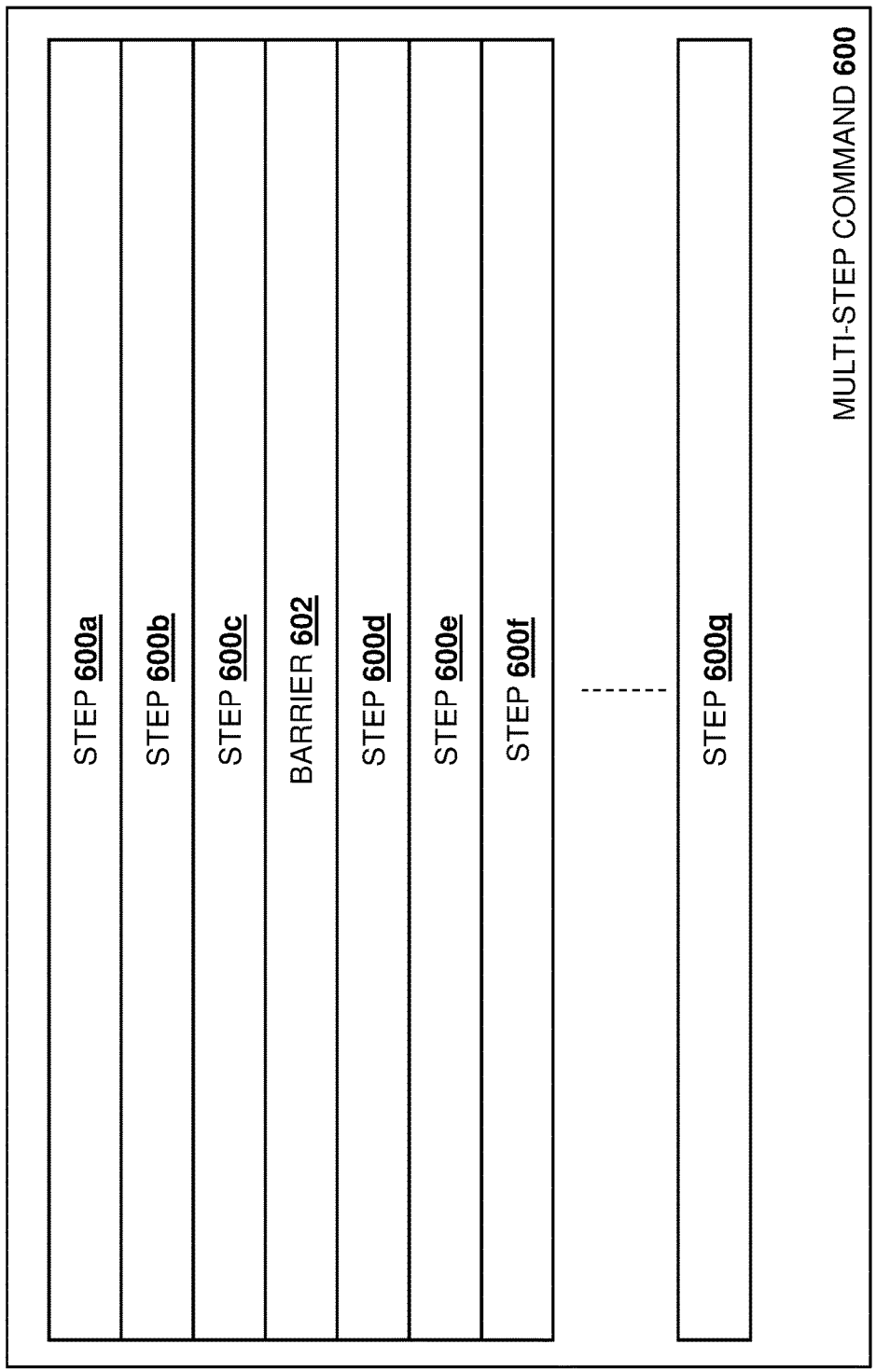
FIG. 6B is a schematic view illustrating an embodiment of a coordinated multi-step command transmitted during the operation of the RAID data storage system of FIG. 2 during the method of FIG. 5.

With reference to FIG. 6A and an embodiment in which the RAID data storage device 206a performs the method 500, the RAID storage controller device 204 is illustrated as transmitting a multi-step command 600 to the RAID data storage device 206a. For example, the RAID storage controller engine 404 in the RAID storage controller device 204/400 may generate the multi-step command 600 and transmit that multi-step command 600 via its communication system 408, and the RAID data storage engine 304 in the RAID data storage device 206a/300 may receive that multi-step command 600 via its communication system 308. Referring to FIG. 6B, an example of the multi-step command 600 is illustrated that includes a plurality of steps 600a, 600b, 600c, 600d, 600e, 600f, and up to 600g, along with a barrier instruction 602 that, in the illustrated embodiment, is provided between the steps 600c and 600d. As discussed in U.S. patent application Ser. No. 16/832,348, filed on Mar. 27, 2020, each of the steps 600a-600g may include one or more operations that are to-be performed by the RAID data storage engine 304 in the RAID data storage device 206a/300, although other multi-operation commands will fall within the scope of the present disclosure as well.

In a specific example, the barrier instruction may be provided by a command primitive, or any other instruction element that would be apparent to one of skill in the art in possession of the present disclosure. Furthermore, as discussed in further detail below, the barrier instruction may include any information that is configured to cause the RAID data storage device 206a to pause performance of the multi-step command until a notification (discussed below) is received, and may identify a trigger for resuming performance of the multi-step command. As discussed in specific examples below, the trigger identified by the barrier instruction may include a memory address in a memory subsystem accessible to the RAID data storage engine 304 in the RAID data storage device 206a/300, along with a data payload (e.g., a Memory Write (MemWr) Peripheral Component Interconnect express (PCIe) Transaction Layer Packet (TLP)) that, when written to that memory address in that memory subsystem, provides a notification to resume performance of the multi-step command. In some embodiments, the memory subsystem including the memory address identified in the barrier instruction may be provided by the buffer subsystem 308 (e.g., a CMB subsystem) in the RAID data storage device 206a/300 discussed above, although one of skill in the art in possession of the present disclosure will recognize that the memory subsystem including the memory address identified in the barrier instruction may be provided by any Memory Mapped Input/Output (MMIO) space that is accessible to the RAID data storage engine 304 in the RAID data storage device 206a/300 while remaining with the scope of the present disclosure as well.

Figure 7A:
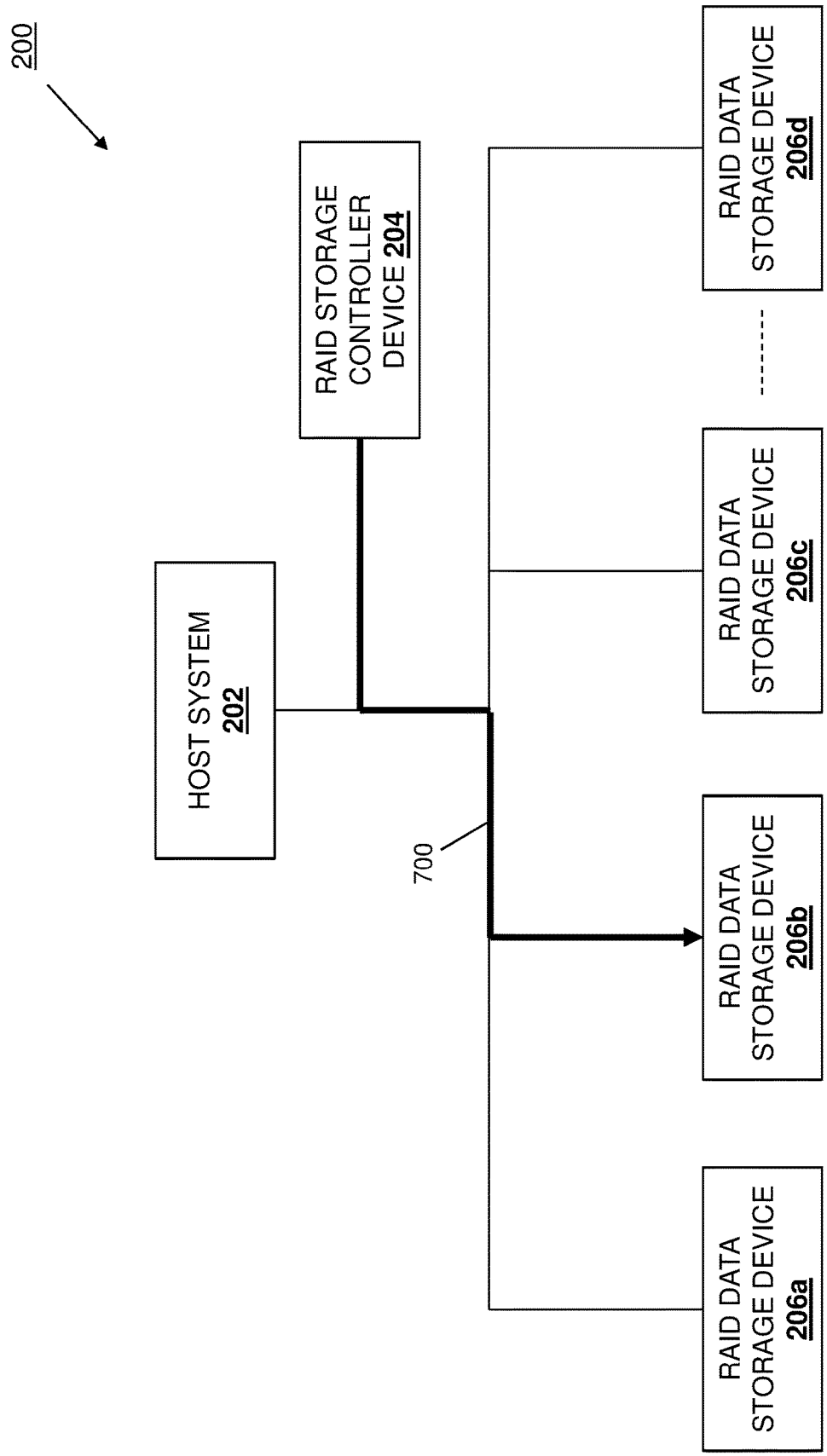
FIG. 7A is a schematic view illustrating an embodiment of the RAID data storage system of FIG. 2 operating during the method of FIG. 5.
Figure 7B:
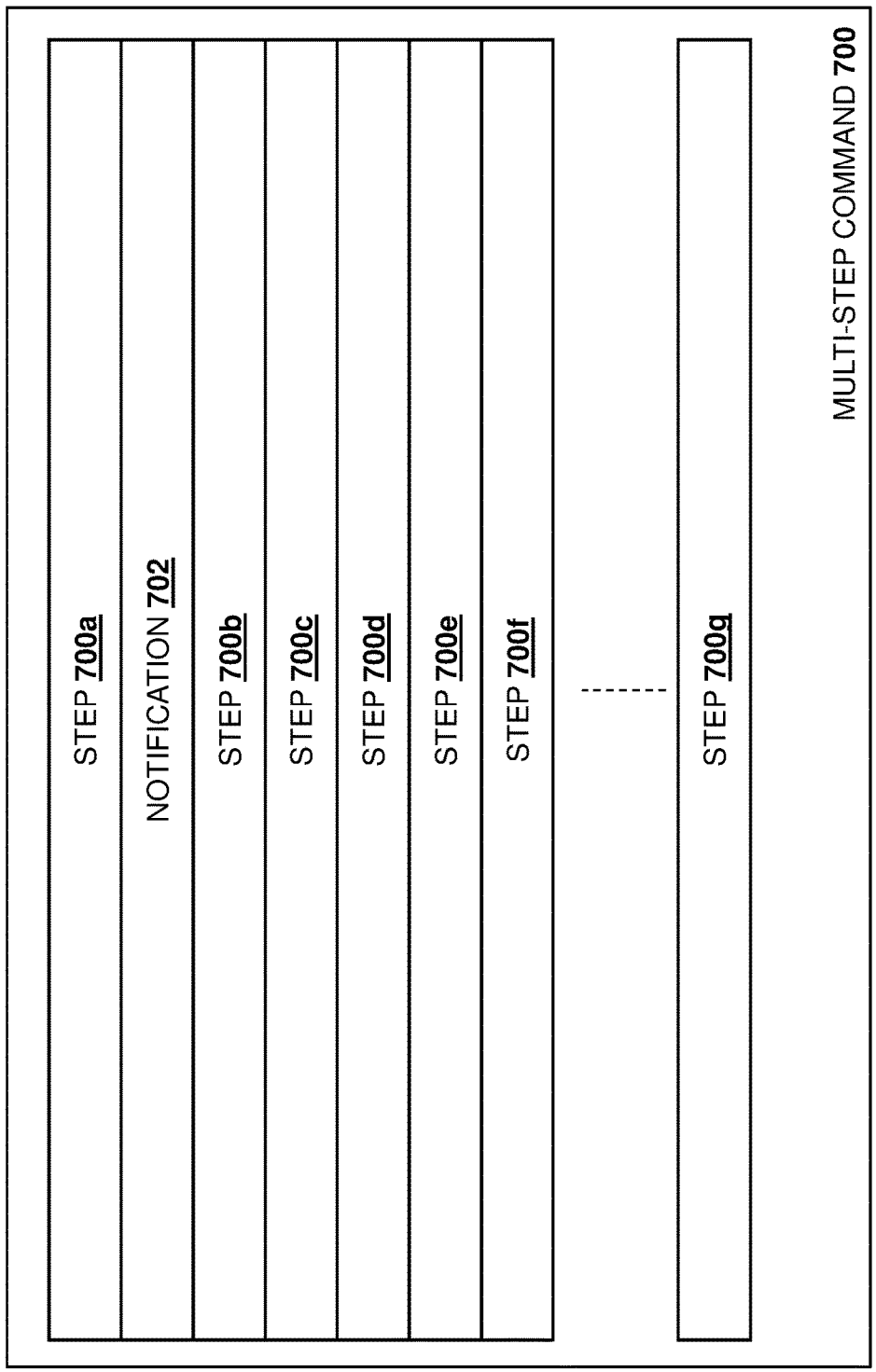
FIG. 7B is a schematic view illustrating an embodiment of a coordinated multi-step command transmitted during the operation of the RAID data storage system of FIG. 2 during the method of FIG. 5.

With reference to FIG. 7A and an embodiment in which the RAID data storage device 206b performs the method 500, the RAID storage controller device 204 is illustrated as transmitting a multi-step command 700 to the RAID data storage device 206b. For example, the RAID storage controller engine 404 in the RAID storage controller device 204/400 may generate the multi-step command 700 and transmit that multi-step command 700 via its communication system 408, and the RAID data storage engine 304 in the RAID data storage device 206b/300 may receive that multi-step command 700 via its communication system 308. Referring to FIG. 7B, an example of the multi-step command 700 is illustrated that includes a plurality of steps 700a, 700b, 700c, 700d, 700e, 700f, and up to 700g, along with a notification instruction 702 that, in the illustrated embodiment, is provided between the steps 700a and 700b. As discussed in U.S. patent application Ser. No. 16/832,348, filed on Mar. 27, 2020, each of the steps 700a-700g may include one or more operations that are to-be performed by the RAID data storage engine 304 in the RAID data storage device 206b/300, although other multi-operation commands will fall within the scope of the present disclosure as well.

In a specific example, the notification instruction may be provided by a command primitive, or any other instruction element that would be apparent to one of skill in the art in possession of the present disclosure. Furthermore, as discussed in further detail below, the notification instruction may include any information that is configured to cause the RAID data storage device 206b to generate and transmit a notification to the RAID data storage device 206a, and may identify any information required to enable that notification. As discussed in specific examples below, the notification identified by the notification instruction may include a memory address in a memory subsystem accessible to the RAID data storage engine 304 in the RAID data storage device 206a/300, along with a data payload (e.g., a MemWr PCIe TLP) that, when written to that memory address in that memory subsystem, provides a notification to the RAID data storage engine 304 in the RAID data storage device 206a/300 to resume performance of the multi-step command. As discussed above, in some embodiments the memory subsystem including the memory address identified in the barrier instruction may be provided by the buffer subsystem 308 (e.g., a CMB subsystem) in the RAID data storage device 206a/300 discussed above, although one of skill in the art in possession of the present disclosure will recognize that the memory subsystem including the memory address identified in the barrier instruction may be provided by any Memory Mapped Input/Output (MMIO) space that is accessible to the RAID data storage engine 304 in the RAID data storage device 206a/300 while remaining with the scope of the present disclosure as well.

In some embodiments, the performance of the method 500 for each of the RAID data storage devices 206a and 206b may include the RAID storage controller engine 404 in the RAID storage controller device 204/400 coordinating the transmission of the multi-step commands to the RAID data storage devices 206a and 206b. For example, one of skill in the art in possession of the present disclosure will appreciate that it may be difficult to determine how quickly the RAID data storage engines 304 in the RAID data storage devices 206a/300 and 206b/300 will perform steps in the multi-step commands 600 and 700, respectively. Using the example provided in the multi-step commands 600 and 700, in the event the RAID data storage device 206b were to perform at least some of the steps 700a-700g and the notification instruction 702 in the multi-step command 700 relatively quickly and before the RAID data storage device 206a were to reach the barrier instruction 602, it is possible that the RAID data storage device could end up being "stuck" at the barrier instruction 602 (e.g., because the notification corresponding to the notification instruction 702 was sent by the RAID data storage device 206b before the RAID data storage device 206a reached the barrier instruction 602.) As such, in some embodiments, notifications may be "latched" by a RAID data storage device that has not yet encountered a barrier instruction, which allows that RAID data storage device to immediately resume operations following identification of the barrier instruction for which an earlier received notification was provided (i.e., by another RAID data storage device.) Furthermore, one of skill in the art in possession of the present disclosure will recognize how multiple notification instructions and barrier instructions (as described below in FIGS. 11 and 12) may be dealt with using similar techniques while remaining within the scope of the present disclosure as well.

The method 500 then proceeds to block 504 where the first RAID data storage device parses the multi-step command. With continued reference to the embodiment in which the RAID data storage device 206a performs the method 500, in this example of decision block 504, the RAID data storage engine 304 in the RAID data storage device 206a/300 may parse the multi-step command 600 and identify the step 600a. With continued reference to the embodiment in which the RAID data storage device 206b performs the method 500, in this example of decision block 504, the RAID data storage engine 304 in the RAID data storage device 206b/300 may parse the multi-step command 700 and identify the step 700a.

The method 500 may then proceed to decision block 506 where it is determined whether a barrier instruction has been identified. With continued reference to the embodiment in which the RAID data storage device 206a performs the method 500, in this example of decision block 506, the RAID data storage engine 304 in the RAID data storage device 206a/300 has identified the step 600a of the multi-step command 600 at block 504 and, thus, the RAID data storage engine 304 in the RAID data storage device 206a/300 will determine that a barrier instruction has not been identified at decision block 506. With continued reference to the embodiment in which the RAID data storage device 206b performs the method 500, in this example of decision block 506, the RAID data storage engine 304 in the RAID data storage device 206b/300 has identified the step 700a of the multi-step command 700 at block 504 and, thus, the RAID data storage engine 304 in the RAID data storage device 206b/300 will determine that a barrier instruction has not been identified at decision block 506.

The method 500 may then proceed to decision block 508 where it is determined whether a notification instruction has been identified. With continued reference to the embodiment in which the RAID data storage device 206a performs the method 500, in this example of decision block 508, the RAID data storage engine 304 in the RAID data storage device 206a/300 has identified the step 600a of the multi-step command 600 at block 504 and, thus, the RAID data storage engine 304 in the RAID data storage device 206a/300 will determine that a notification instruction has not been identified at decision block 508. With continued reference to the embodiment in which the RAID data storage device 206b performs the method 500, in this example of decision block 506, the RAID data storage engine 304 in the RAID data storage device 206b/300 has identified the step 700a of the multi-step command 700 at block 504 and, thus, the RAID data storage engine 304 in the RAID data storage device 206b/300 will determine that a notification instruction has not been identified at decision block 506.

The method 500 then proceeds to block 510 where the first RAID data storage device performs the step of the multi-step command. With reference to the embodiment in which the RAID data storage device 206a performs the method 500, in this example of block 510, the RAID data storage engine 304 in the RAID data storage device 206a/300 may operate to perform the step 600a of the multi-step command 600 that was identified at block 504. With reference to the embodiment in which the RAID data storage device 206b performs the method 500, in this example of block 510, the RAID data storage engine 304 in the RAID data storage device 206b/300 may operate to perform the step 700a of the multi-step command 700 that was identified at block 504.

The method 500 may then proceed to decision block 512 where it is determined whether the multi-step command has been completed. With reference to the embodiment in which the RAID data storage device 206a performs the method 500, in this example of decision block 512 and following the performance of the step 600a of the multi-step command 600 at block 510, the RAID data storage engine 304 in the RAID data storage device 206a/300 may determine that the multi-step command 600 has not been completed (i.e., that additional steps 600b-600g have not yet been performed.) With reference to the embodiment in which the RAID data storage device 206b performs the method 500, in this example of decision block 512 and following the performance of the step 700a of the multi-step command 700 at block 510, the RAID data storage engine 304 in the RAID data storage device 206b/300 may determine that the multi-step command 700 has not been completed (i.e., that additional steps 600b-600g have not yet been performed).

In response to determining that the multi-step command has not been completed at decision block 512, the method 500 may return to block 504. As such, for each step identified when parsing the multi-step command received at block 502 and as long as it is determined that the multi-step command has not been completed at decision block 512, the method 500 may loop such that that step is performed at block 510 (after determining that no barrier instruction was identified at decision block 506 and no notification instruction was identified at block 508). Thus, with reference to the embodiment in which the RAID data storage device 206a performs the method 500 using the multi-step command 600, the method 500 may loop such that the RAID data storage engine 304 in the RAID data storage device 206a/300 performs steps 600b and 600c of the multi-step command 600 on subsequent iterations of the method 500. In some embodiments, at block 504, the RAID data storage engine 304 in the RAID data storage device 206a/300 may perform the steps 600a-600c in the multi-step command 600 sequentially (e.g., by first performing step 600a, followed by the performance of step 600b, and followed by the performance of step 600c.)

However, in other embodiments, the RAID data storage engine 304 in the RAID data storage device 206a/300 may re-order the steps 600a-600c for performance in any order (while ensuring that the barrier instruction 602 is not re-ordered, i.e., only steps prior to a barrier instruction may be reordered), may perform one or more of the steps 600a-600c in parallel, and/or may perform the steps 600a-600c in any manner that would be apparent to one of skill in the art in possession of the present disclosure. Furthermore, while the example of the multi-step command 600 provided in FIG. 6B includes at steps 600a-600c prior to the barrier instruction 602, in some embodiments a multi-step command may include a barrier instruction prior to any steps in that multi-step command. As such, in some embodiments, "performance" of the multistep command at block 504 may include basic processing the multi-step command in order to identify that barrier instruction and without performing any actual steps in the multi-step command.

With reference to the embodiment in which the RAID data storage device 206b performs the method 500, following the performance of the step 600c of the multi-step command 600 at block 510 and a determination that the multi-step command 600 has not been completed at decision block 512, the method 500 may return to block 504 where the RAID data storage engine 304 in the RAID data storage device 206a/300 parses the multi-step command 600 to identify the barrier instruction 602 included in the multi-step command 600. As such, the RAID data storage engine 304 in the RAID data storage device 206a/300 may operate to identify any information in the barrier instruction 602 that is configured to cause the RAID data storage device 206a to pause performance of the multi-step command 600 until a notification (discussed below) is received and, in response, may also operate to identify the trigger discussed above for resuming performance of the multi-step command 600. In a specific example, the RAID data storage engine 304 in the RAID data storage device 206a/300 may identify the trigger for resuming performance of the multi-step command 600 that includes memory address in a memory subsystem accessible to the RAID data storage engine 304 in the RAID data storage device 206a/300, along with a data payload (e.g., a MemWr PCIe TLP) that, when written to that memory address in that memory subsystem, provides a notification to resume performance of the multi-step command.

If, at decision block 506, it is determined that a barrier instruction has been identified, the method 500 proceeds to block 514 where the first RAID data storage device pauses performance of the multi-step command. In an embodiment, at block 514 and in response to determining that the barrier instruction 602 has been identified at decision block 506, the RAID data storage engine 304 in the RAID data storage device 206a/300 may operate to pause the performance of the multi-step command 600. As such, following the identification of the barrier instruction 602 at decision block 506, the RAID data storage engine 304 in the RAID data storage device 206a/300 will stop performing the multi-step command 600 such that the step 600d (as well as any of the steps 600e, 600f, and up to 600g) is not performed.

The method 500 then proceeds to decision block 516 where it is determined whether a notification has been received. In an embodiment, at decision block 516 and while the performance of the multi-step command 600 is paused as per block 514, the RAID data storage engine 304 in the RAID data storage device 206a/300 may operate to determine whether a notification has been received that is configured to cause the RAID data storage engine 304 in the RAID data storage device 206a/300 to resume the performance of the multi-step command 600. Continuing with the example provided above, at decision block 516, the RAID data storage engine 304 in the RAID data storage device 206a/300 may operate to monitor the memory address in a memory subsystem that is accessible to the RAID data storage engine 304 in the RAID data storage device 206a/300 and that was identified in the barrier instruction 602 for the data payload (e.g., a MemWr PCIe TLP) that was identified in the barrier instruction 602. However, while a specific example is provided, one of skill in the art in possession of the present disclosure will recognize that other notification techniques may be utilized that will fall within the scope of the present disclosure as well.

If, at decision block 516, it is determined that no notification has been received, the method 500 returns to block 514. As such, the method 500 may loop between block 514 and decision block 516 such that, once the barrier instruction 602 is identified, the RAID data storage device 206a pauses performance of the multi-step command 600 until a notification is received.

With reference to the embodiment in which the RAID data storage device 206b performs the method 500, in an embodiment of block 504 and following the performance of the step 700a of the multi-step command 700 at block 510 and the determination that the multi-step command 700 has not been completed at decision block 512, the RAID data storage engine 304 in the RAID data storage device 206b/300 may operate to parse the multi-step command 700 and identify the notification instruction 702. While only a single step 700a is illustrated in the example of the multi-step command 700 prior to the notification instruction 702, similarly as discussed above for the RAID data storage device 200a, the RAID data storage engine 304 in the RAID data storage device 206b/300 may perform steps in a multi-step command in order, may re-order steps in a multi-step command for performance in any order, may perform one or more of steps in a multi-step command in parallel, and/or may perform the steps in a multi-step command in any manner that would be apparent to one of skill in the art in possession of the present disclosure. Furthermore, while the example of the multi-step command 700 provided in FIG. 7B includes a step 700a prior to the notification instruction 702, in some embodiments a multi-step command may include a notification instruction prior to any steps in that multi-step command. As such, "performance" of the multi-step command at block 504 may include basic processing the multi-step command in order to identify that notification instruction and without performing any actual steps in the multi-step command.

With continued reference to the embodiment in which the RAID data storage device 206b performs the method 500, in this example of decision block 506 in which the parsing of the multi-step command 700 identified the notification instruction 702, the RAID data storage engine 304 in the RAID data storage device 206b/300d will determine that no barrier instruction has been identified and the method 500 will proceed to decision block 508. In this example, at decision block 508, the RAID data storage engine 304 in the RAID data storage device 206b/300d will identify the notification instruction 702 included in the multi-step command 700. As such, the RAID data storage engine 304 in the RAID data storage device 206b/300 may operate to identify any information in the notification instruction 702 that is configured to cause the RAID data storage device 206b to generate and transmit a notification to the RAID data storage device 206a, and may identify any information required to enable that notification. As discussed in specific examples below, the notification identified by the notification instruction 702 may include a memory address in a memory subsystem accessible to the RAID data storage engine 304 in the RAID data storage device 206a/300, along with a data payload (e.g., a MemWr PCIe TLP) that, when written to that memory address in that memory subsystem, provides a notification to the RAID data storage engine 304 in the RAID data storage device 206a/300 to resume performance of the multi-step command.

Figure 8:
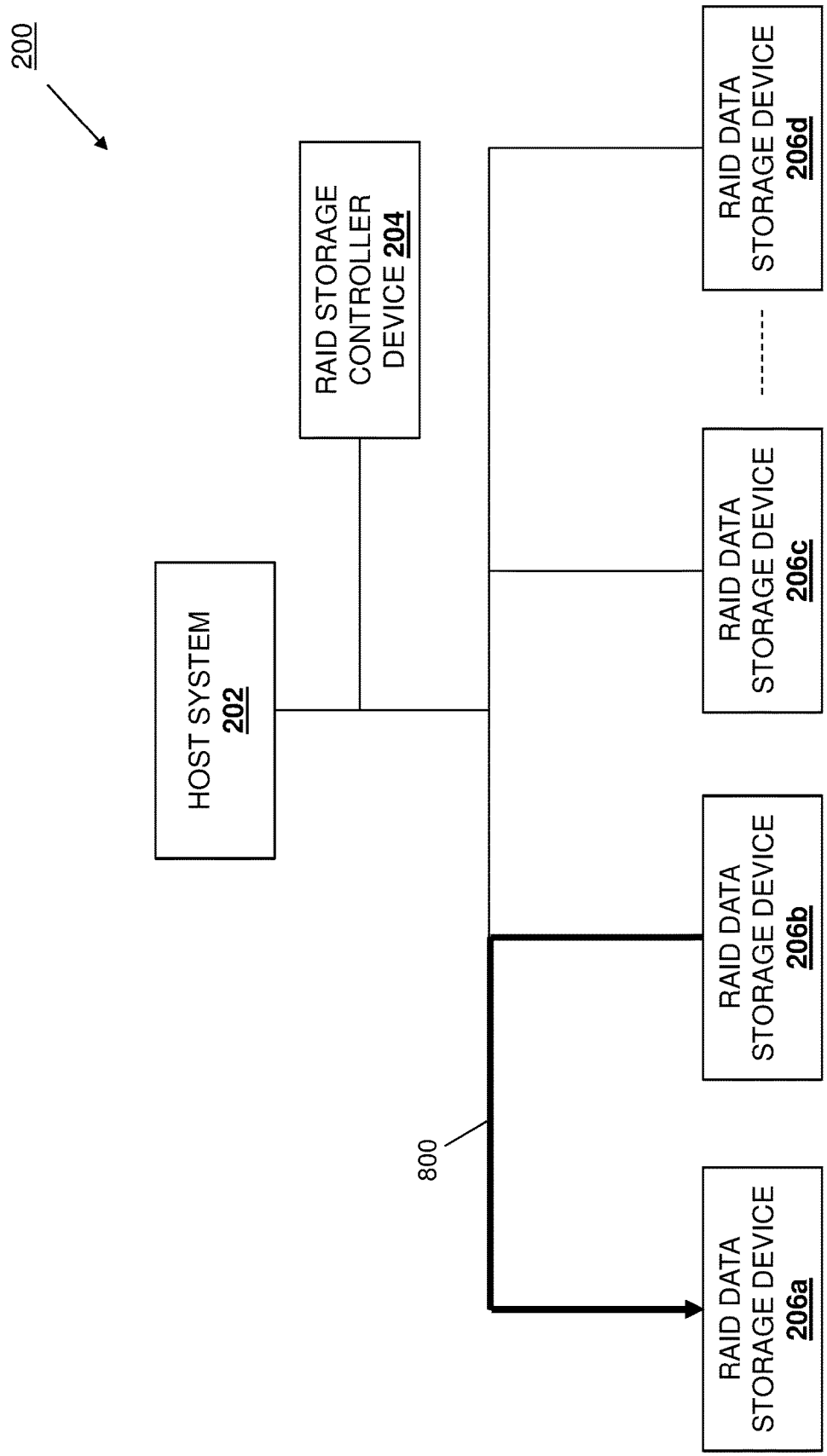
FIG. 8 is a schematic view illustrating an embodiment of the RAID data storage system of FIG. 2 operating during the method of FIG. 5.

If, at decision block 508, it is determined that a notification instruction has been identified, the method 500 proceeds to block 518 where the first RAID data storage device transmits a notification to a second RAID data storage device. With reference to FIG. 8, in an embodiment of block 518 and in response to identifying the notification instruction 702 at decision block 512, the RAID data storage engine 304 in the RAID data storage device 206b/300d may operate to provide a notification 800 to the RAID data storage device 206a. For example, at block 518, the RAID data storage engine 304 in the RAID data storage device 206b/300d may write the data payload (e.g., a MemWr PCIe TLP) to the memory address in the memory subsystem that is accessible to the RAID data storage engine 304 in the RAID data storage device 206a/300 and that is identified in the notification instruction 702. However, as discussed above, while a specific notification technique is described, one of skill in the art in possession of the present disclosure will recognize that the notification 800 may be provided in a variety of manners that will fall within the scope of the present disclosure as well.

The method 500 then proceeds to decision block 512 where the RAID data storage engine 304 in the RAID data storage device 206b/300d determines whether the multi-step command 700 has been completed. As such, following the identification of the notification instruction 702 and the transmission of the notification 800, the RAID data storage engine 304 in the RAID data storage device 206b/300 determines whether the multi-step command 700 has been completed by, for example, determining whether the step 700g in the multi-step command 700 has been completed. Furthermore, if the RAID data storage engine 304 in the RAID data storage device 206b/300 determines that the multi-step command 700 has not been completed, the method 500 returns to block 504. As such, with regard to the embodiment in which the RAID data storage device 206b performs the method 500, the method 500 may loop such that the RAID data storage device 206b performs the remaining steps 700b-700g in the multi-step command 700 until it is completed.

With continued reference to the embodiment in which the RAID data storage device 206a performs the method 500, when the RAID data storage device 206a is performing block 514 of the method 500 to pause the performance of the multi-step command 600, and the RAID data storage device 206b transmits the notification 800 to the RAID data storage device 206a at block 518 in response to identifying the notification instruction 702 at decision block 508, the RAID data storage engine 304 in the RAID data storage device 206a will determine that the notification instruction 800 has been received at decision block 516. For example, as discussed above, the RAID data storage engine 304 in the RAID data storage device 206a/300 may operate to monitor the memory address in a memory subsystem that is accessible to the RAID data storage engine 304 in the RAID data storage device 206a/300 and that was identified in the barrier instruction 602 and, at decision block 516, may detect the data payload (e.g., a MemWr PCIe TLP) that was identified in the barrier instruction 602 and written by the RAID data storage engine 304 in the RAID data storage device 206b at block 518.

Thus, if at decision block 516 the RAID data storage engine 304 in the RAID data storage device 206a determines that the notification 800 has been received, the method 500 may return to block 504 where the RAID data storage engine 304 in the RAID data storage device 206a parses the multi-step command 600. As such, continuing with the specific example provided above, subsequent to the pausing of the performance of the multi-step command 600 at block 508 after the performance of steps 600a-600c and the identification of the barrier instruction 602, the RAID data storage engine 304 in the RAID data storage device 206a/300 may resume and complete the performance of the multi-step command 600 (e.g., by completing the steps 600d-600g of the multi-step command 600) in subsequent iterations of the method 500.

Figure 9:
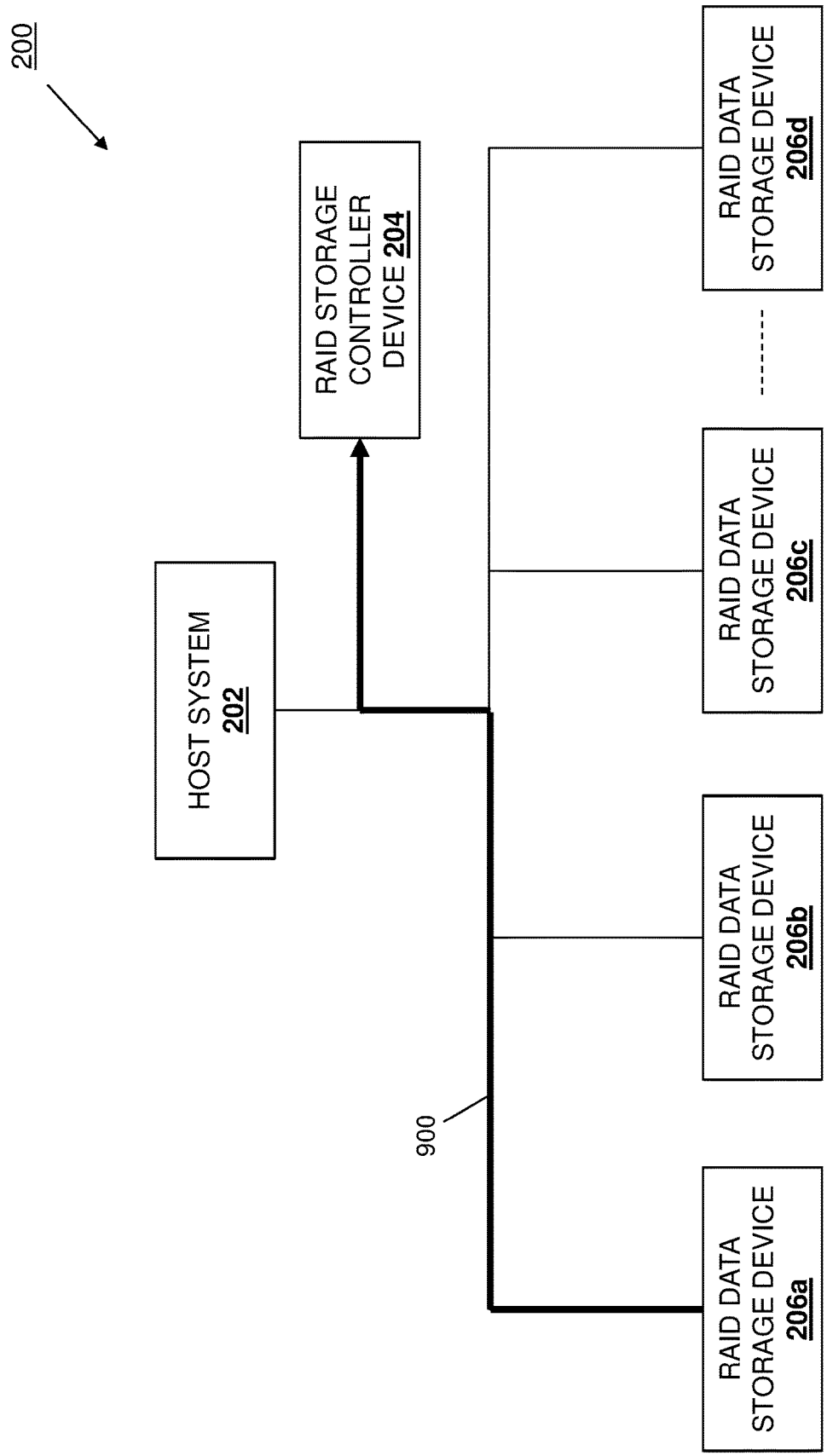
FIG. 9 is a schematic view illustrating an embodiment of the RAID data storage system of FIG. 2 operating during the method of FIG. 5.
Figure 10:
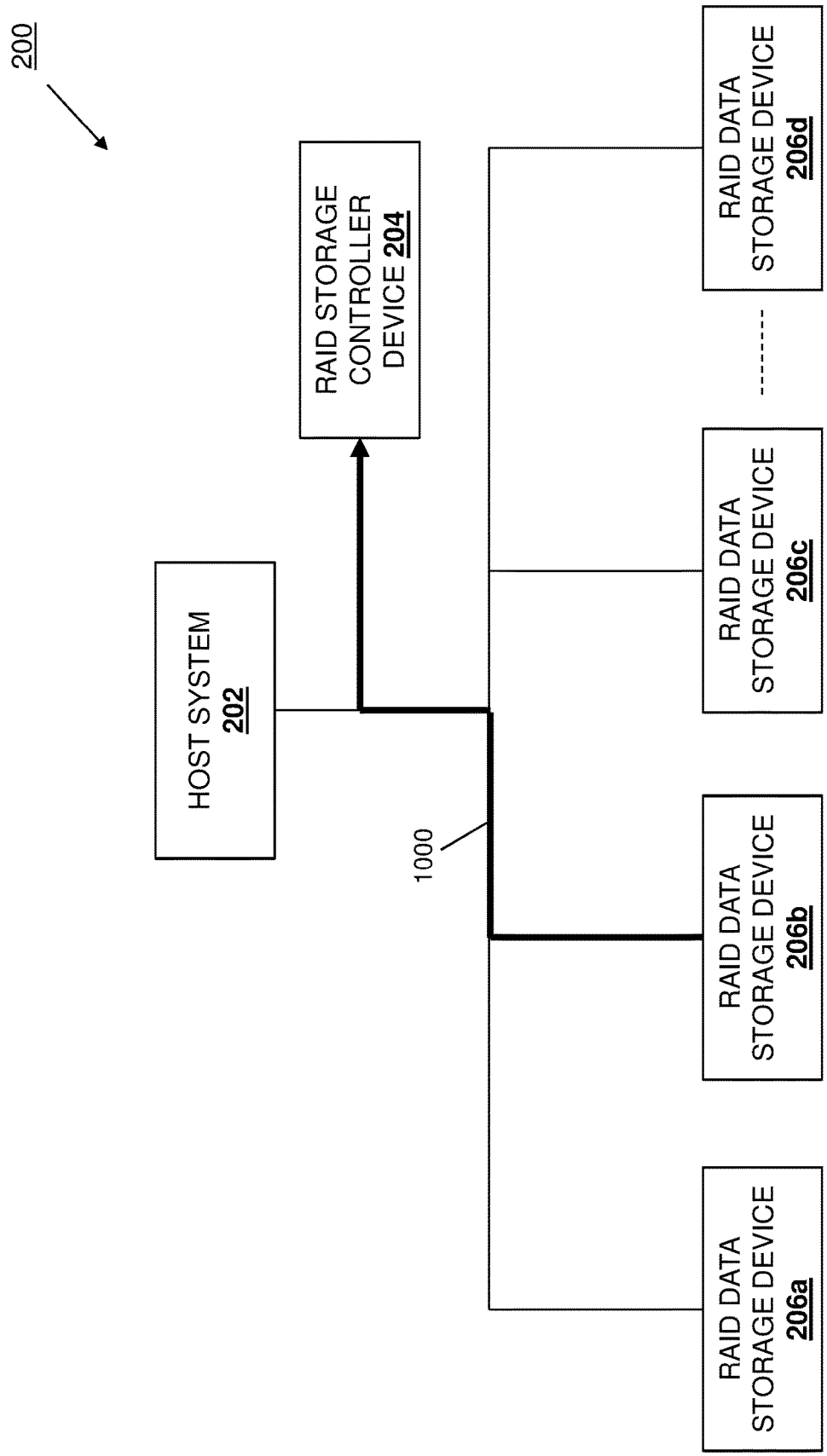
FIG. 10 is a schematic view illustrating an embodiment of the RAID data storage system of FIG. 2 operating during the method of FIG. 5.

If, at decision block 512, it is determined that the multi-step command has been completed, the method 500 proceeds to block 520 where the first RAID data storage device sends a completion message to the RAID storage controller device. With continued reference to the embodiment in which the RAID data storage device 206a performs the method 500, if the RAID data storage engine 304 in the RAID data storage device 206a/300 determines that the multi-step command 600 has been completed, the RAID data storage engine 304 in the RAID data storage device 206a/300 may transmit a completion message 900 to the RAID storage controller device 204, as illustrated in FIG. 9. Similarly, with continued reference to the embodiment in which the RAID data storage device 206b performs the method 500, if the RAID data storage engine 304 in the RAID data storage device 206b/300 determines that the multi-step command 700 has been completed, the RAID data storage engine 304 in the RAID data storage device 206b/300 may transmit a completion message 1000 to the RAID storage controller device 204, as illustrated in FIG. 10.

As such, one of skill in the art in possession of the present disclosure will appreciate how the method 500 may loop such that RAID data storage devices operating according to the method 500 perform the steps of the multi-step command, pause performance of the multi-step command when a barrier instruction is identified in the multi-step command, provide notifications when a notification instruction is identified in the multi-step command, and resume performance of the multi-step command when a notification is received, as long as the multi-step command being performed by that RAID data storage device has not been completed. Furthermore, one of skill in the art in possession of the present disclosure will recognize how the RAID storage controller device 204 may generate coordinated multi-step commands in a manner that ensures that no RAID data storage device proceeds past a step in their multi-step command if doing so requires the completion of step(s) in another multi-step command(s) being performed by other RAID data storage device(s).

Figure 11:
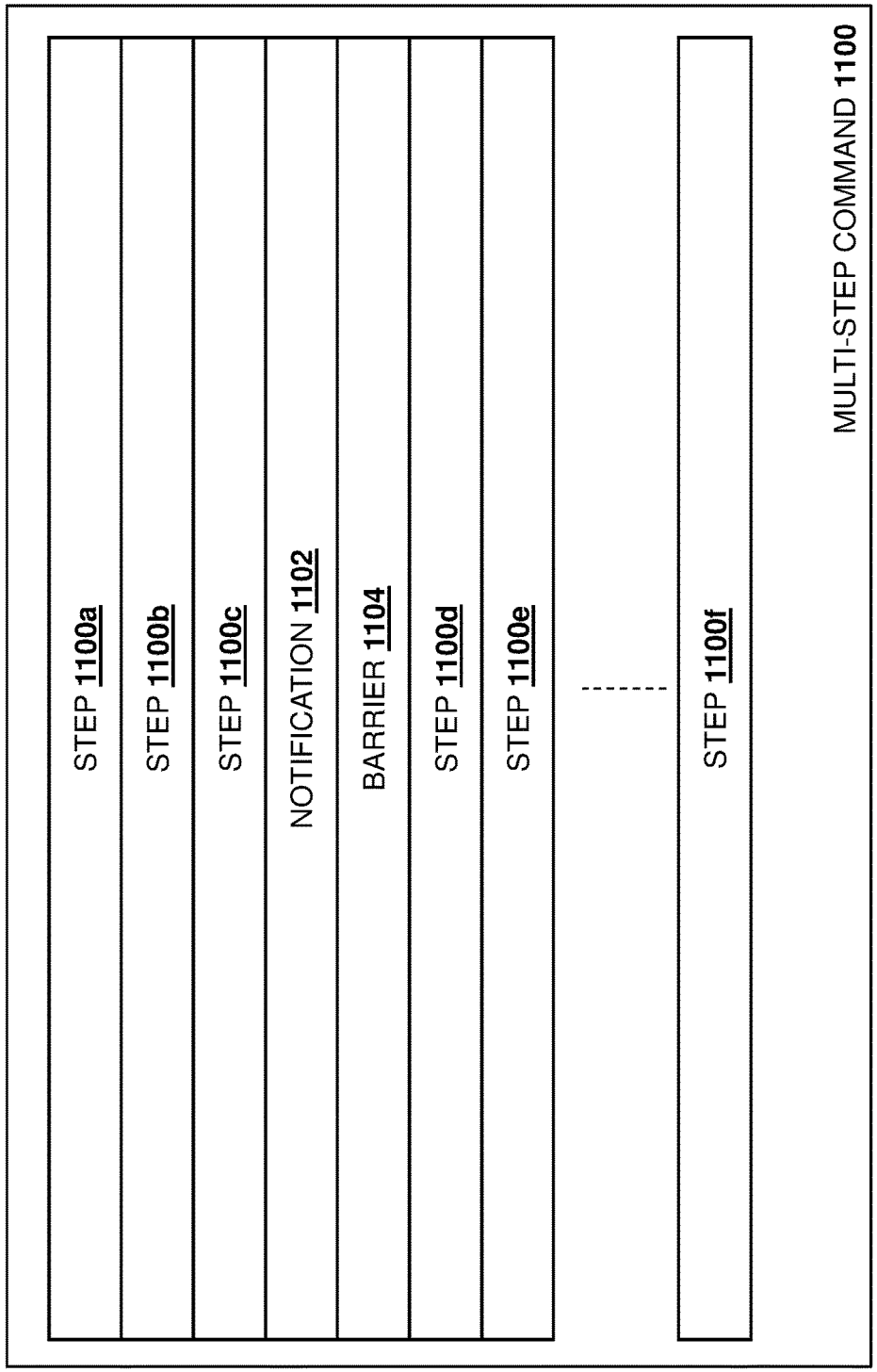
FIG. 11 is a schematic view illustrating an embodiment of a coordinated multi-step command that may be transmitted during the operation of the RAID data storage system of FIG. 2 during the method of FIG. 5.
Figure 12:
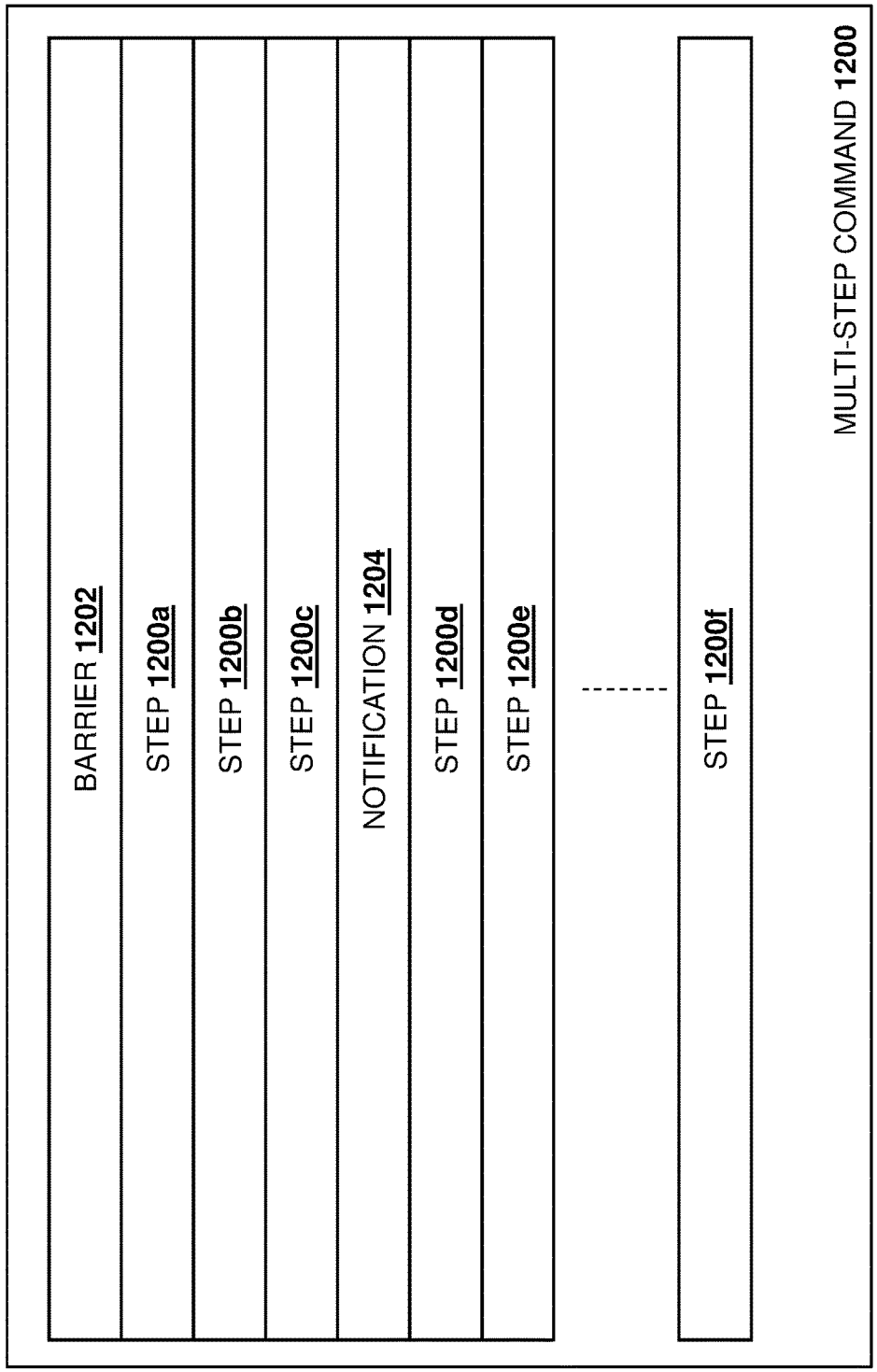
FIG. 12 is a schematic view illustrating an embodiment of a coordinated multi-step command that may be transmitted during the operation of the RAID data storage system of FIG. 2 during the method of FIG. 5.

As discussed above, the embodiment described above provides a greatly simplified example of the multi-step command coordination of the present disclosure, and one of skill in the art in possession of the present disclosure will appreciated that higher level of coordination may be enabled by the teachings herein. For example, FIG. 11 illustrates a multi-step command 1100 that includes steps 1100a, 1100b, 1100c, 1100d, 1100e, and up to 1100f, along with a notification instruction 1102 immediately following step 1100c, and a barrier instruction 1104 immediately following the notification instruction 1102 and immediately preceding the step 1100d. Similarly, FIG. 12 illustrates a multi-step command 1200 that includes steps 1200a-, 1100b, 1200c, 1200d, 1200e, and up to 1200f, along with a barrier instruction 1102 immediately preceding step 1100a, a notification instruction 1204 immediately following step 1200C and immediately preceding the step 1200d. Similarly as discussed above, the multi-step command 1200 may be provided to a first RAID data storage device, and the multi-step command 1100 may be provided to a second RAID data storage device.

Upon receiving the multi-step command 1200, the first RAID data storage device will pause its performance of the multi-step command 1200 in response to identifying the barrier instruction 1202, while upon receiving the multi-step command 1100, the second RAID data storage device will perform steps 1100a-1100c, will provide a notification to the first RAID data storage device in response to identifying the notification instruction 1102, and will pause its performance of the multi-step command 1100 in response to identifying the barrier instruction 1104. In response to receiving the notification from the second RAID data storage device, the first RAID data storage device will resume performance of the multi-step command 1200 and perform steps 1200a-1200c, will provide a notification to the second RAID data storage device in response to identifying the notification instruction 1204, and will then perform steps 1200d-1200f. In response to receiving the notification from the first RAID data storage device, the second RAID data storage device will resume performance of the multi-step command 1100 and perform steps 1100d-1100f. As discussed above, latching techniques may be utilized to ensure that any notification that is sent by a first RAID data storage device (e.g., to cause a second RAID data storage device to resume performance of a multi-step command following reaching a corresponding barrier instruction in that multi-step command) and that is received by a second RAID data storage device prior to reaching its corresponding barrier instruction will still be used by the second RAID data storage device to resume performance of the multi-step command once that barrier instruction is reached. As such, the coordinated multi-step commands of the present disclosure may be provided at a variety of levels of higher complexity depending on the desired coordinated operation of the RAID data storage devices to which they are provided.

Thus, systems and methods have been described that provide for the coordination of the performance of the steps in respective multi-step commands by different RAID data storage devices. For example, a RAID storage controller device may generate and transmit a first multi-step command that includes a barrier instruction to a first RAID data storage device, and may generate and transmit a second multi-step command that includes a notification instruction to a second RAID data storage device. The first RAID data storage device receives the first multi-step command, identifies the barrier instruction included in the first multi-step command and, in response, pauses performance of first multi-step command. The second RAID data storage device receives the second multi-step command, identifies the notification instruction included in the second multi-step command and, in response, transmits a notification to the first RAID data storage device. The first RAID data storage device determines, while pausing the performance of the first multi-step command, that the notification has been received and, in response, resumes the performance of the first multi-step command. As such the performance of different multi-step commands by different RAID data storage devices may be coordinated, which one of skill in the art in possession of the present disclosure will recognize provides particular benefits when the steps performed by one of those RAID data storage devices rely on the performance of steps by any of the other RAID data storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disks (RAID) data storage device multi-step command coordination system, comprising:
 a Redundant Array of Independent Disks (RAID) storage controller device that is configured to:
  generate and transmit a first multi-step command that includes a barrier instruction; and
  generate and transmit a second multi-step command that includes a notification instruction;
 a first RAID data storage device that is coupled to the RAID storage controller device and that is configured to:
  receive, from the RAID storage controller device, the first multi-step command;
  identify the barrier instruction included in the first multi-step command;
  pause, in response to identifying the barrier instruction, performance of the first multi-step command;
  determine, while pausing the performance of the first multi-step command, that a notification has been received' and
  resume, in response to determining that the notification has been received, the performance of the first multi-step command; and
 a second RAID data storage device that is coupled to the RAID storage controller device and the first RAID data storage device, wherein the second RAID data storage device is configured to:
  receive, from the RAID storage controller device, the second multi-step command;
  identify the notification instruction included in the second multi-step command;
  transmit, in response to identifying the notification instruction, the notification to the first RAID data storage device.

2. The system of claim 1, wherein the first RAID data storage device is configured to:
 perform a first subset of first multi-step command steps in the first multi-step command prior to identifying the barrier instruction; and
 perform a second subset of first multi-step command steps in the first multi-step command subsequent to resuming the performance of the first multi-step command.

3. The system of claim 1, wherein the second RAID data storage device is configured to:
 perform a first subset of second multi-step command steps in the second multi-step command prior to identifying the notification instruction; and
 perform a second subset of second multi-step command steps in the second multi-step command subsequent to transmitting the notification.

4. The system of claim 1, wherein the determining that the notification has been received includes:
 determining that data has been written to a notification address in a storage subsystem included in the first RAID data storage device.

5. The system of claim 4, wherein the RAID storage controller device is configured to:
 identify, to the second RAID data storage device, the data and the notification address.

6. The system of claim 4, wherein notification address in the storage subsystem is included in a Memory Mapped Input/Output (MMIO) space.

7. The system of claim 1, wherein the RAID storage controller device is configured to:
 transmit the first multi-step command prior to transmitting the second multi-step command.

8. An Information Handling System (IHS), comprising:
 a processing system; and
 a memory system that is coupled to the processing system and that includes instructions that, when executed by the processing system, cause the processing system to provide a RAID data storage engine that is configured to:
  receive, from a RAID storage controller device, a first multi-step command;
  identify a barrier instruction included in the first multi-step command;
  pause, in response to identifying the barrier instruction, performance of the first multi-step command;
  determine, while pausing the performance of the first multi-step command, that a first notification has been received from a RAID data storage device; and
  resume, in response to determining that the first notification has been received, the performance of the first multi-step command.

9. The IHS of claim 8, wherein the RAID data storage engine is configured to:
 perform a first subset of first multi-step command steps in the first multi-step command prior to identifying the barrier instruction; and
 perform a second subset of first multi-step command steps in the first multi-step command subsequent to resuming the performance of the first multi-step command.

10. The IHS of claim 8, wherein the RAID data storage engine is configured to:
 receive, from the RAID storage controller device, a second multi-step command;
 identify a notification instruction included in the second multi-step command; and
 transmit, in response to identifying the notification instruction, a second notification to the RAID data storage device.

11. The IHS of claim 10, wherein the RAID data storage engine is configured to:
 perform a first subset of second multi-step command steps in the second multi-step command prior to identifying the notification instruction; and
 perform a second subset of second multi-step command steps in the second multi-step command subsequent to transmitting the second notification.

12. The IHS of claim 8, wherein the determining that the first notification has been received includes:

determining that data has been written to a notification address in a storage subsystem that is connected to the processing system.

13. The IHS of claim 8, wherein notification address in the storage subsystem is included in a Memory Mapped Input/Output (MMIO) space.

14. A method for coordinating multi-step commands performed by RAID data storage devices, comprising:
receiving, by a first RAID data storage device from a RAID storage controller device, a first multi-step command;
identifying, by the first RAID data storage device, a barrier instruction included in the first multi-step command;
pausing, by the first RAID data storage device in response to identifying the barrier instruction, performance of the first multi-step command;
determining, by the first RAID data storage device while pausing the performance of the first multi-step command, that a first notification has been received from a second RAID data storage device; and
resuming, by the first RAID data storage device in response to determining that the first notification has been received, the performance of the first multi-step command.

15. The method of claim 14, further comprising:
performing, by the first RAID data storage device, a first subset of first multi-step command steps in the first multi-step command prior to identifying the barrier instruction; and
performing, by the first RAID data storage device, a second subset of first multi-step command steps in the first multi-step command subsequent to resuming the performance of the first multi-step command.

16. The method of claim 14, further comprising:
receiving, by the first RAID data storage device from the RAID storage controller device, a second multi-step command;
identifying, by the first RAID data storage device, a notification instruction included in the second multi-step command; and
transmitting, by the first RAID data storage device in response to identifying the notification instruction, a second notification to the second RAID data storage device.

17. The method of claim 16, further comprising:
performing, by the first RAID data storage device, a first subset of second multi-step command steps in the second multi-step command prior to identifying the notification instruction; and
performing, by the first RAID data storage device, a second subset of second multi-step command steps in the second multi-step command subsequent to transmitting the second notification.

18. The method of claim 14, further comprising:
identifying, by the first RAID storage controller device to the second RAID data storage device, the data and the notification address.

19. The method of claim 14, wherein the determining that the first notification has been received includes:
determining by the first RAID data storage device that data has been written to a notification address in a storage subsystem that is connected to the processing system.

20. The method of claim 14, wherein notification address in the storage subsystem is included in a Memory Mapped Input/Output (MMIO) space.

* * * * *